US006742903B2

(12) United States Patent
Canning

(10) Patent No.: US 6,742,903 B2
(45) Date of Patent: Jun. 1, 2004

(54) ARRANGEMENT OF CORNER REFLECTORS FOR A NEARLY OMNIDIRECTIONAL RETURN

(76) Inventor: Francis X. Canning, 3557 Lesser Dr., Newbury Park, CA (US) 91320

( * ) Notice: Subject to any disclaimer, the term of this patent is extended or adjusted under 35 U.S.C. 154(b) by 0 days.

(21) Appl. No.: 10/013,217

(22) Filed: Dec. 12, 2001

(65) Prior Publication Data

US 2003/0021028 A1 Jan. 30, 2003

Related U.S. Application Data

(60) Provisional application No. 60/307,579, filed on Jul. 25, 2001.

(51) Int. Cl.$^7$ .............................................. G02B 5/122
(52) U.S. Cl. ......................................... 359/529; 342/7
(58) Field of Search ........................... 359/529; 342/7, 342/5

(56) References Cited

U.S. PATENT DOCUMENTS

| 1,384,014 | A | | 7/1921 | Fessenden | |
|---|---|---|---|---|---|
| 2,463,517 | A | * | 3/1949 | Chromak | ........................ 342/8 |
| 2,702,900 | A | | 2/1955 | Matson, Jr. | |
| 2,746,035 | A | | 5/1956 | Norwood | |
| 2,763,000 | A | | 9/1956 | Graham | |
| 2,908,002 | A | | 10/1959 | Van Atta | |
| 3,039,093 | A | | 6/1962 | Rockwood | |
| 3,500,417 | A | | 3/1970 | Adams | |
| 4,104,634 | A | * | 8/1978 | Gillard et al. | .................. 342/7 |
| 4,148,033 | A | | 4/1979 | Speckter | |
| 4,176,355 | A | | 11/1979 | Harris | |
| 4,352,106 | A | | 9/1982 | Firth | |
| 4,551,726 | A | | 11/1985 | Berg | |
| 4,980,688 | A | * | 12/1990 | Dozier, Jr. | ...................... 342/9 |
| 5,097,265 | A | | 3/1992 | Aw | |
| 5,179,382 | A | | 1/1993 | Decker | |
| 5,430,444 | A | | 7/1995 | Rix | |

FOREIGN PATENT DOCUMENTS

EP          0 000 447 A1    1/1979

* cited by examiner

Primary Examiner—Drew Dunn
Assistant Examiner—Joshua L Pritchett

(57) ABSTRACT

An array of corner reflectors is used to provide a retro-reflector for a large range of incident angles. A novel orientation of the individual corner reflectors is used. This allows the interior of a first corner to remain visible while the interior of a second corner becomes visible. This may be done while maintaining a phase coherence between the contributions of the first and second corner reflectors. Phase coherence ensures constructive interference among the returns from the first and second corner reflectors. Coherence is achieved by an arrangement which places the interior vertices of the corner reflectors close to each other. One such arrangement also places the peak return from one corner reflector acting as a dihedral between the locations of the dihedral and trihedral returns of a second corner reflector. This arrangement results in a substantially uniform and strong retro-return. Phase coherence may be maintained over a desired range of elevation angles.

20 Claims, 9 Drawing Sheets

300

ARRANGEMENT OF CORNER REFLECTORS FOR A NEARLY OMNIDIRECTIONAL RETURN

RELATED APPLICATION

The present application claims priority under 35 U.S.C. 119(e) from U.S. Provisional Application No. 60/307,579, filed Jul. 25, 2001, titled "ARRANGEMENT OF CORNER REFLECTORS FOR A NEARLY OMNIDIRECTIONAL RETURN."

BACKGROUND OF THE INVENTION

1. Field of the Invention

Retro reflectors for electromagnetic waves, acoustic waves, and other wave phenomena have been known since the Fessenden patent (1,384,014) in 1921. These devices reflect the wave energy preferentially in the direction back toward the source. This creates a much stronger reflection of energy back toward the source than would occur if the reflection were to be equally strong in all directions.

2. Description of the Related Art

A retro reflector is a device which generally produces a strong return in the direction of the source, while the strength of this return may depend on the orientation of the reflector. The Luneberg Lens is completely insensitive to the direction of incidence of the waves. This is often a desirable property. However, the Luneberg Lens is unsuitable for many applications for reasons such as cost and weight. Cost and weight are also a limitation for the Van Atta Array, which generally is sensitive to the direction of incidence.

An alternative which is often cheaper to build and lighter in weight is a corner reflector consisting of two or three substantially perpendicular surfaces, similar to those used in the Fessenden patent. Retro reflectors may also consist of an array of corner reflectors, each oriented differently. These retro reflectors have received much attention. They originally were used primarily for radar and more recently have become especially important also for light such as from lasers. They are also useful for sonar. However, in prior art they generally have had a significant limitation. While they give a strong return towards the source over many or most incident directions of the waves, they generally give a weak return over some ranges of incident directions. This can be a significant limitation. For example, small boats often use radar reflectors so that they can be seen on a large ship's radar in foggy conditions. This is an aid in preventing collisions. However, if there are certain directions where the backscattered return is weak, then for ships approaching from these directions they might not be seen from a distance and a collision might occur.

The importance of a uniformly strong backscattered return for all (or for a large range of) incidence angles has been widely recognized. Boating magazines and the sales literature for radar reflectors for small boats have often included graphs of this strength for several commercially available radar reflectors from different manufacturers. One set of test results that is often quoted is the Admiralty Surface Weapons Establishment tests from England.

Test results have shown again and again that a corner formed by three mutually perpendicular reflecting surfaces gives an effective retro reflector. It produces a very strong return for all incidence angles which look into the corner and which see a significant area for all three surfaces. However, there are some incidence directions which see the interior of a corner, while this incidence direction is also nearly parallel to one of the three surfaces. That is, for these directions the projected area of that one surface (projected onto a plane perpendicular to the incidence direction) is very small. In this case, when looked at from the source, one of the surfaces of the retro reflector is viewed nearly end on. For these directions, the retro return may not be strong. This results in a serious limitation in prior art.

Often, an array of retro reflectors is formed by three perpendicular (or nearly perpendicular) intersecting reflecting surfaces, where each surface continues past the line of intersection. This produces eight interior corners, each of which functions as a retro reflector for some angles of incidence. We will call this the standard array of corner reflectors. FIG. 1 gives an example of the standard array of corner reflectors. Four of the interior corners are visible in FIG. 1 and there are four more corners which are not visible in this view.

The standard array of corner reflectors has a significant limitation. For waves incident in a direction nearly parallel to any one of its surfaces, the retro return may be small. For some applications using the standard array, the directions of incidence that are important are all substantially horizontal directions. For example, for a boat in conditions of limited visibility it is important to appear on the radar of other boat and ships. When the standard array is used, it may be oriented in different ways. The orientation has a significant affect on the strength of the retro-return. The orientation with one surface horizontal and two surfaces vertical will be called the "spill water" orientation. The orientation with one corner pointed upwards will be called the "hold water" position. The hold water orientation is illustrated in FIG. 1. In this orientation, one might think of the upper corner as holding water that is poured into it. This language will be used even though the surfaces of the retro reflector might not contain water. For example, they may have large holes or they may be made from a mesh or a porous material. The hold water orientation is often considered as the preferred orientation. For incidence from substantially horizontal directions, it is less likely that a direction of an incident source will be nearly parallel to one of its surfaces than for the spill water orientation. However, for some horizontal directions this does still occur.

The importance of producing a large retro return in all directions has led to attempts to "finesse" the problems that a non omnidirectional retro reflector creates. For example, a retro reflector can be made to spin. Two examples of this are given in the Norwood Patent (#2,746,035) and the Matson patent (#2,702,900).

There have been many attempts at making the return of a retro reflector more even as a function of the incident direction. Taking just one example of many, the Aw Patent (#5,097,265) describes an array of twenty corner reflectors (twenty interior corners). It is possible to arrange an array of reflectors by the "Aw" method or by many other methods so that for all angles of incidence there is at least one corner reflector such that its interior and all three of its interior surfaces can be seen. However, this is not sufficient to ensure a strong retro return for all angles of incidence. Wave phenomena involve interference effects. The return from two or more corner reflectors may interfere constructively or destructively. Destructive interference can cause two returns to cancel or to nearly cancel each other, resulting in a very weak total return.

One might also attempt to make the return more even as a function of incidence direction by use a large number (in some cases as large a number as twenty or more) of corner reflectors all oriented differently. Certain theorems in statistics, related to the central limit theorem, then suggest the properties that result. It is unlikely that destructive interference would give a very weak return for any angle of incidence. However, this method generally produces a somewhat uniform return for all angles, which is uniformly moderate, not strong and not weak.

The amount of energy returned to the source by a retro reflector depends on many factors, such as the design and orientation of the reflector, the distance to the source, and the strength of the source. In some cases polarization also matters. If all of these factors are kept constant, then the energy returned will increase as a larger retro reflector is used. The amount of energy that a retro reflector intercepts will be proportional to the square of its linear dimension. However, for a well designed retro reflector the amount of energy returned to the source will be approximately proportional to the fourth power of its linear dimension. The reason for this is that larger retro reflectors direct the reflected energy into a narrower beam. This beam is narrower in both directions transverse to the direction of propagation. Thus, for larger retro reflectors more energy is reflected and also a larger fraction of the reflected energy will hit the source.

Three properties can be identified as desirable for a retro reflector made from an array of corner reflectors. First, a few large corner reflectors are better than many small corner reflectors. This follows from the fact that, for one corner and for incidence towards the interior of that corner, the strength of the retro-return is approximately proportional to the fourth power of the linear size of the corner. Second, for all incidence angles that are of interest, at least one (or more) corner should be oriented to produce a large return. Third, if more than one corner reflector produces a large return for some incidence angle, then these returns should be substantially in phase. This will ensure constructive interference.

These properties are not absolute. In part, they are based on "high frequency" approximations which describe wave phenomena. The term "high frequency" means that these approximations become more accurate when physical dimensions become much larger than a wavelength. Also, there are other important properties which have not been mentioned. However, the three properties identified above may be a useful aid in understanding some of the important differences between the present invention and prior art.

BRIEF SUMMARY OF THE INVENTION

For scattering of waves such as sound or electromagnetic radiation, including but not limited to radar, light and sonar, the wave has both a magnitude and a phase. For two waves to interfere constructively, their phases need to be substantially equal. If their phases are approximately opposite, then they interfere destructively. To insure a strong return from a retro reflector, it is desirable that when the interiors of two corners are both visible from some direction the returns from these two corners interfere constructively. A sufficient condition to ensure this is that the round trip path lengths for reflection from these two corners do not differ by more than a quarter of a wavelength.

The reflection off each of the three sides of a corner may be described approximately by the condition that the angle of incidence equals the angle of reflection. The corner is generally constructed with these three sides approximately perpendicular to each other. A ray incident towards the interior of a corner reflects off all three sides of the corner and then is directed back towards the source of that ray. As an example, one of the corners in FIG. 1 is formed by the three sides 101, 102, and 103. The word "ray" is related to a high frequency approximation, which is useful for understanding approximations to how a retro reflector behaves. Each of the various possible ray paths results in the same total distance traveled (assuming parallel rays incident from a distant source). For different ray paths the ray bounces off different parts of the sides of the corner and may also reflect off the successive sides in different orders. The distance traveled for any of these rays is the same as for a ray which goes to the interior vertex 104, and then reverses direction. The term interior vertex is defined to be the point where the three sides of a corner meet.

The path length traveled for any of the rays reflected from the three sides of a corner may be described by the location of the corner's interior vertex. If radiation were incident from a substantially horizontal direction, and two different corners were to have vertices located one above the other, then the total path lengths for both corners would also be approximately the same. This would result in constructive interference.

The standard array in hold water orientation has eight corners. One is on the top, and one is on the bottom. The remaining six are on the sides. In FIG. 1 the corner on the top has the three sides 105, 106, and 107. A limitation of this array is that as one looks at it substantially horizontally from various azimuthal directions, there are six such directions in which there is no corner with its interior visible. These are directions which look along one of the surfaces, and the interior of that surface is not visible. For example, one of these directions would be for a source in the plane containing the surface 102. For many directions near these six directions, the retro return may be small.

This invention consists of more than one corner, in a novel arrangement. This invention can be applied using two or more corners. For example, it may be applied using six corners. However, their orientation and placement will be different than as in the standard array. We define the lower three corners as those corners where two sides meet in a line along their upper portion. The corner formed by sides 101, 102, and 103 is a lower corner. Sides 101 and 102 meet along the line 108. The lower corners have one side along their bottom, such as side 103 which has an edge 105. The three upper corners have two sides meeting along their lower portion, and one side along their upper portion. The corner formed by sides 106, 109, and 101 is an upper corner. Sides 109 and 101 meet along the line 110.

The lower three corners might be rotated so that they face more upwards, while the three upper corners might be rotated so that they face lower, as compared to their orientation in the standard array. As viewed from the side, this results in the corners becoming more "open" in the sense that when viewed from the side more interior area may be seen. This rotation will be called an opening rotation. For the lower corner formed by 101, 102, and 103, this rotation is about an axis parallel to the line 105. When viewed from the right end of line 105 (the end that intersects side 102), the opening rotation is a clockwise rotation.

In performing this rotation, the sizes of the faces of the corners may also be modified by "trimming" so as to make the array fit together better. Also, for example, if a wire mesh is used for the surfaces, then as an option the surfaces of the corners might be permitted to penetrate through each other to some extent. In addition, the corners may be translated (moved without rotation) to help them to fit together.

A smaller number of corners can also be used. For example, two successive corners might be used, with an opening rotation for one or both. The arrangement of corners described here allows the interior of at least one corner to be visible from every incident direction in some range of interest. For example, one corner might be visible from every substantially horizontal incident direction. This is a result of the opening rotation, which is one feature distinguishing this invention from the standard array. This new arrangement also provides that when the interiors of two corners are visible at the same time, the path length for both corners is generally approximately equal. In one embodiment it is approximately equal because the vertices of these two corners are displaced substantially vertically, and the incidence direction is substantially horizontal. In other embodiments there is a horizontal displacement which is small. Also, in some embodiments this arrangement provides that an approximately vertical displacement between interior vertices is small. Since it is small, the difference in the two path lengths traveled is relatively insensitive to small changes in the orientation of the array or small changes from horizontal incidence. This is especially useful when used on a sailboat which may be healing to one side. As the opening rotation is made larger, this difference in path lengths generally grows larger. It is thus desirable minimize the size of the opening rotation. More generally, by minimizing the opening rotation the interior corners of different corners may be kept spatially close to each other which permits a variety of orientations with the path lengths approximately equal.

There are two important results of an opening rotation. Both of these results were discussed above, but it is worth repeating them. First, for many incident directions of interest for a ray, the three sides are presented more evenly to that ray. This generally results in a larger retro return from that one corner. These directions of interest are often have a large horizontal component and a relatively small vertical component. Second, for such directions the range of azimuthal directions that look into the interior of one corner is larger. For example, for horizontal incidence and the standard array in hold water orientation, the interior of one corner may be seen over sixty degrees of azimuth. An opening rotation increases this to greater than sixty degrees.

Using the language of a ray approximation, one mechanism for a corner to give a relatively strong reflection in the retro direction is three reflections, one from each interior face. The term trihedral return is defined to be this relatively strong reflection in the retro direction. This trihedral return is associated with the aspect angles for which this return is relatively strong. For example, using the lower corner in FIG. 1, the trihedral return would involve reflections off of sides 101, 102, and 103 in any order. For an incident ray nearly parallel to one of the three faces, there can also be a relatively strong return after two reflections, one off of each of the other two faces. The term dihedral return is defined to be this relatively strong reflection in the retro direction after two reflections. This dihedral return is associated with the aspect angles for which this return is relatively strong. For example, again using the lower corner of FIG. 1, an incident ray might be approximately in the plane of side 102. A dihedral return would involve that ray bouncing off of sides 101 and 103 in either order.

For an incident ray very nearly in the plane of surface 102, the dihedral return may be strong. However, for small changes in the incident direction the dihedral return may not be strong. For one corner, there generally is a range of incident directions, between those where the trihedral return for a corner is strong and where the dihedral return for that corner is strong. This is an angular region where the retro-return is relatively weak. It is possible to choose an opening rotation such that the dihedral return from one corner is located in the angular region between the trihedral and dihedral returns from another corner. This results in the total return being relatively uniform in angle, since it eliminates the null which would otherwise be present between the trihedral and dihedral returns for that other corner. This is a desirable method since it only requires a relatively small opening rotation. For example, a much larger opening rotation would be required to eliminate the null by making the trihedral return from one corner overlap the trihedral return from another corner.

This invention involves an array of two or more corner reflectors, with opening rotations and with translations of the individual corner reflectors. These are chosen to produce a strong retro-return and/or a substantially uniform retro-return over a desired range of angles.

DESCRIPTION OF THE FIGURES

The advantages and features of the disclosed invention will be readily appreciated by persons skilled in the art from the following detailed description when read in conjunction with the drawings listed below.

FIG. 5A illustrates five degrees of opening rotation. FIG. 5B illustrates ten degrees of opening rotation. FIG. 5C illustrates fifteen degrees of opening rotation.

DETAILED DESCRIPTION OF THE INVENTION

Figure 1:
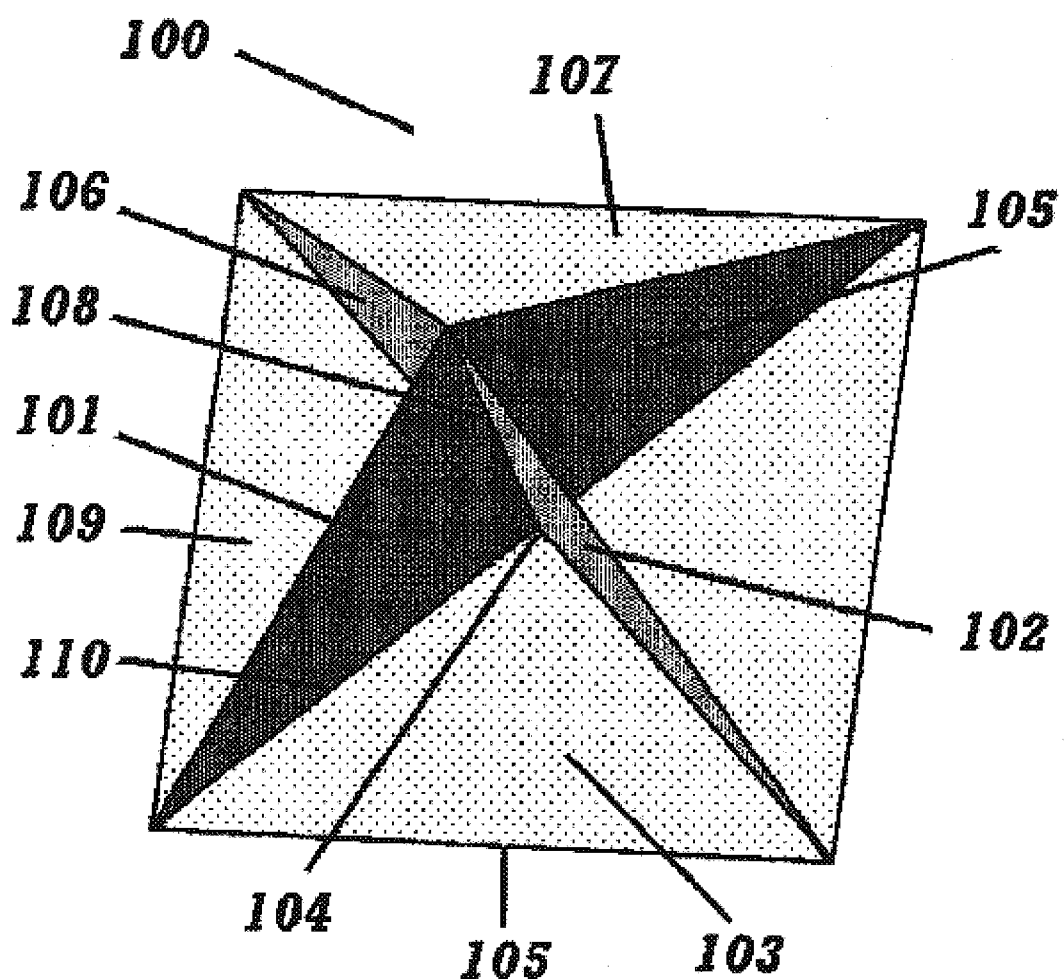
FIG. 1 illustrates the standard array of eight corners. Four of the corners are visible and the other four are not visible from this side. The orientation of the standard array shown is called the hold water orientation.

Consider a "sample" retro reflector consisting of one corner, described by coordinates in a right handed coordinate system, (x,y,z). The +z direction will be considered vertical, in the upwards direction. The first, second, and third vertices of this corner will be (−1,−1,0), (1,−1,0), and (0,0,$2^{1/2}$) respectively. The three lines, each which joins one of the three pairs these vertices, form the exterior edges of the corner. The fourth vertex is at (0,0,0). This will also be called the interior vertex. There are an additional three lines, each which joins the fourth vertex and one other vertex, and they form the interior edges of the corner. The three planar surfaces of the corner are the three regions between any pair of interior edges and the associated exterior edge. This specific reflector will be used as a convenient example, to explain how corners may be orientated. The use of this example does not imply any limitation on the shapes that corners may take. For example, often the exterior edges are formed by a curved arc rather than by straight lines. Also, each of the three faces may each have different dimensions and different areas than the other faces.

This sample corner may be rotated in a clockwise direction, about the +x axis, so that the second and third vertices have the same z coordinate. If the angle of rotation is called r, then setting the z coordinates of these vertices equal gives $$\text{Sin}(r) = 2^{1/2} \text{Cos}(r) \tag{1}$$

The solution to this equation is $$r = \text{Tan}^{-1}(2^{1/2}) = 54.7356 \ldots \text{ degrees} \tag{2}$$

After this rotation, the fourth or interior vertex is still at (0,0,0), while the first, second third vertices have the same z coordinate. The direction of the +z axis (which will also be called the upward direction) is the direction of a symmetric ray to this corner. The term symmetric ray indicates the ray for which rotating the corner by 120 degrees about this ray does not change the geometry. Note that the symmetric ray is an angle of r (=54.7356 . . . degrees) from the line from the third to the fourth vertex. Because of the three fold rotation symmetry, the symmetric ray is at this same angle r from a line connecting the interior vertex and any of the first three vertices (i.e. from any interior edge).

Notice that each interior edge is perpendicular to its opposite planar surface. As a result, the angle between the symmetric ray and any of the three planar surfaces, s, is given by $$s = 90 \text{ degrees} - r = 35.2644 \ldots \text{ degrees} \tag{3}$$

The term "standard array" is used for an array of eight corner reflectors formed by three intersecting planes. All of the interior vertices of these eight corners meet at approximately one point. This one point is the interior vertex of each of the eight corners.

The last several paragraphs may be summarized is a few short conclusions. For a corner formed by three similar perpendicular sides, there is a symmetric ray. If one were to look at this corner from the direction of this ray, then all three sides would present the same area. This ray is at an angle of 35.2644 . . . degrees from each side of the corner. This ray is at an angle of 54.7356 . . . degrees from each of the three lines formed by the intersection of two sides of that corner.

From these facts, it is easy to determine the elevation of the symmetric ray for the lower corners and for the upper corners for the standard array in hold water position. The symmetric ray for any upper corner is at an angle of 70.529 . . . degrees (which is two times 35.2644) from the vertical. The symmetric ray for any lower corner is at an angle of 109.471 . . . degrees (which is two times 54.7356) from the vertical. For both upper and lower corners, the symmetric ray is 19.471 . . . degrees from the horizontal. An opening rotation makes these symmetric rays point more nearly horizontal. A "full opening rotation" is a rotation through 19.741 degrees. However, there are many advantages to using a "moderate opening rotation" through less than 19.471 degrees. For example, as the symmetric ray for a corner approaches the horizontal direction, the retro-reflective properties of that corner change less and less. There are many disadvantages to large opening rotations, so it generally is advantageous to stop at less than 19.471 degrees. For example, in addition to the issues regarding path length and a coherent return, larger opening rotations result in the corners being disposed throughout a larger volume. Using again the example the use of a retro-reflector on a sailboat, the increased wind resistance of a larger device would generally be considered a disadvantage. Thus, moderate opening rotations, defined as opening rotations through less than 19.471 degrees, are advantageous.

Notice that for the standard array in the "spill water" orientation, there is a four fold symmetry about the vertical direction. That is, moving azimuthally around the array, four corners are seen in succession. The interior of each corner may be seen over ninety _degrees of azimuth. In the "hold water" orientation, there is a three fold symmetry. As one looks from all azimuthal directions, three pairs of corners are seen. Each pair has one lower corner and one upper corner. The interior of each such corner may be seen over sixty degrees of azimuth.

It is clear that the azimuthal angle over which a corner is visible depends on the orientation of that corner. Consider the lower corner formed by sides 101, 102, and 103 in FIG. 1. Its lower surface 103 is at an angle of r=54.7356 degrees from horizontal. More generally, this lower corner could be rotated about an axis through edge 105. This could change the angle from horizontal of the lower surface to an angle "x". Then, over what range of azimuthal angles could one see the interior of this corner? This can be found by simple geometry. The size of the range of azimuthal angles w, is given by $$\text{Cos}(w/2) = (1 + \text{Cos}^2(x))^{-1/2} \tag{4}$$

When this tilt angle x is equal to r=54.7356, then w should be 60 degrees. Each corner is visible over 60 degrees in azimuth, and there are six corners. As a result exactly one corner can be seen at any of the 360 possible angles of incidence. Using equation (1) for r and the "Pythagorean Relation" for the sine and cosine functions, one finds that $$\cos^2(r) = 1/3 \quad (5)$$

Setting x equal to r and using (5) in equation (4), one finds that (4) then implies that w is equal to 60 degrees for this tilt angle, as expected.

When the tilt angle x is zero, the corner is one from a standard array in the spill water orientation. Because of the four fold symmetry, the interior of each corner should be seen for 90 degrees of azimuthal viewing angles. Putting in zero for x in equation (4) does result in w equaling 90 degrees as expected.

The present invention gives an array which, in one embodiment, has six corners visible from various azimuthal angles. However, the interior of each corner can be made visible over more than 60 degrees. Or, this can be done for just some of the corners, as desired. This can be achieved by orientating corners at angles different from r. If x is less than r, then the corresponding angle w is then greater than 60 degrees. This can be done while still maintaining a coherent return among corners.

In FIG. 1 there is a lower corner with sides 101, 102, and 103. The side 103 is at an angle of r=54.7356 degrees from horizontal. There is also an upper corner with sides 101, 106, and 109. Its upper surface 106 is also at an angle of r=54.7356 degrees from horizontal. For each of these corners, an opening rotation would decrease this angle. For example, for the lower corner an opening rotation would be a rotation about the edge 105. While the edge 105 used here is straight, it may be curved in other embodiments. In those cases, one possible rotation axis to use in defining the opening rotation is the direction in the horizontal plane which is also perpendicular to the symmetric ray for the corner.

Tilting the corners this way results in an additional unexpected improvement. Tilting the corners this way makes their three surfaces more effective at reflection at all substantially horizontal angles. This occurs because after tilting all three surfaces present a projected area which is more uniform among the three surfaces. The projected areas are more uniform because the symmetric ray for each corner is closer to horizontal. It is more uniform for larger and larger moderate opening rotations, meaning opening rotations of less than 19.471 degrees. However, as a full opening rotation is approached, that is, as 19.471 degrees of rotation is approached, this uniformity stops improving. Often even a limited opening rotation, that is, an opening rotation of fifteen degrees or less, will be a desirable choice.

In FIG. 1 there are three upper corners, each having an upper surface terminated in a horizontal edge. These upper surfaces are 105, 106, and 107. For this "hold water" orientation of a standard array, each of these upper surfaces is an angle s from the vertical. These three upper corners each has a symmetric ray which is also an angle s from that same surface. Thus, their symmetric ray is an angle of 2s from vertical. The other three side corners, the lower three corners, have a symmetric ray an angle of 2r from the vertical. Notice that 2s is approximately 70.53 degrees and 2r is approximately 109.47 degrees.

For the standard array, the interior vertices of all eight corners are at essentially the same point. It would be ideal if it were possible to tilt all six side corners while keeping this property. This would require that the surfaces of different corners pass through each other, which generally is undesirable.

One possible placement of the corners would keep the interior vertices of the three upper corners at substantially the same point as each other. The interior vertices of the lower corners might also be kept at substantially the same point as each other. In addition, the common location of the interior vertices of the upper corners might be approximately vertically above the common location of the vertices of the lower corners. As an alternative, rather than having the three upper corners meeting at a point, the interior vertex of each might in addition be displaced radially away from each other, or radially towards each other. This might also be done with the lower corners. Other arrangements are also possible.

Figure 2:
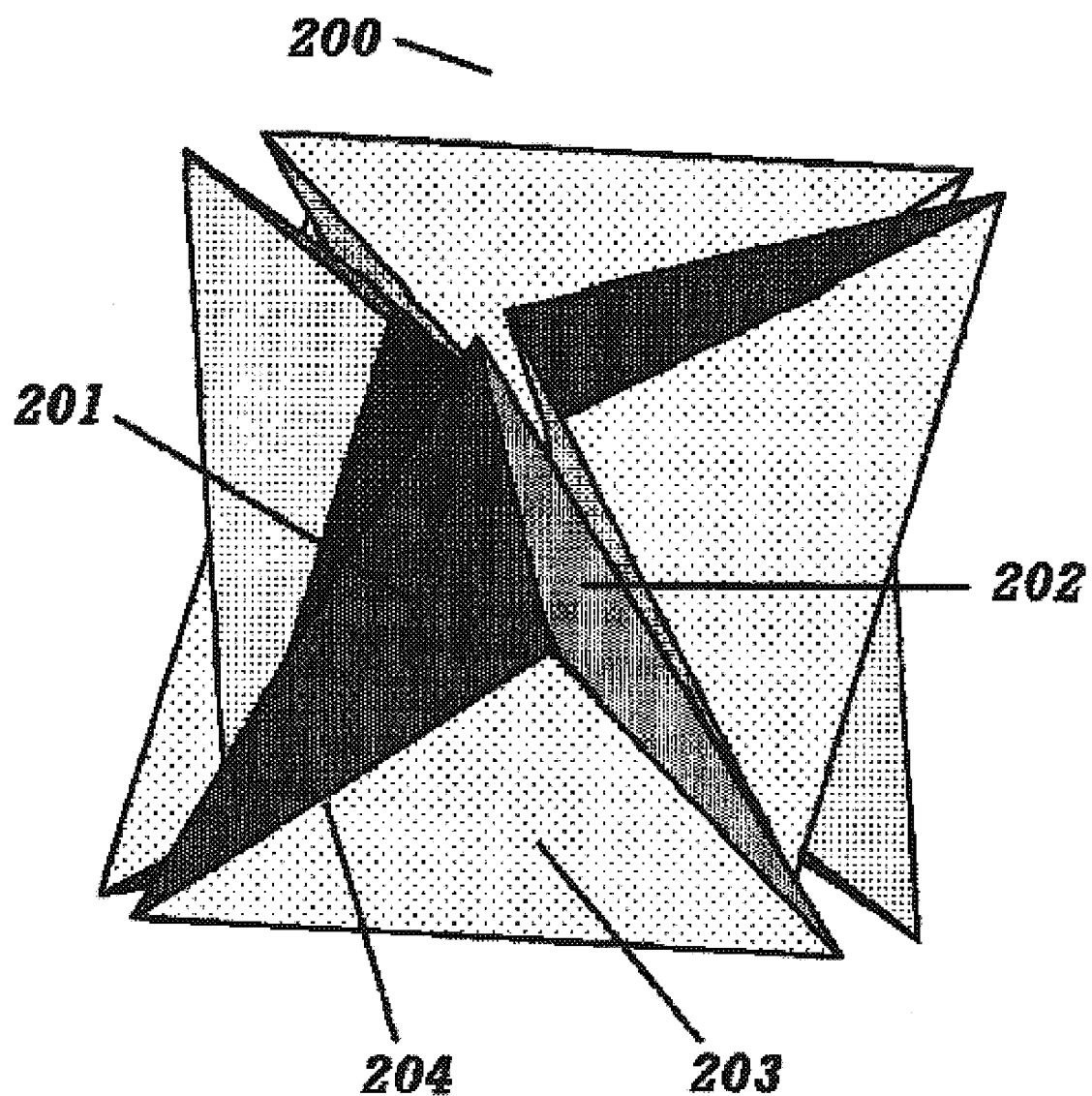
FIG. 2 illustrates six corners, each with an opening rotation of fourteen degrees with respect to the orientations in the standard array. The length of the intersection of two sides of any corner is five units. The interior vertices of the three upper corners meet at a point and the interior vertices of the three lower corners meet at a different point. The interior vertices of the upper corners meet two units above the interior vertices of the three lower corners.

FIG. 2 gives an example of one such possible arrangement. The view shown here is the same view (meaning from the same orientation) as shown in FIG. 1. A lower corner, formed by sides 201, 202, and 203 is prominent in this figure. Sides 201 and 203 intersect in a line 204. This line is five wavelengths long. The three lower corners have interior vertices which meet at one point. Two wavelengths above that is a point where the interior vertices of the three upper corners meet. An opening rotation of fourteen degrees was used for the three lower and for the three upper corners. Thus, for example, the lower surface of the lower corners is at an angle of 40.7356 degrees from horizontal. Due to the opening rotation, more of surface 202 is visible that was visible for surface 102 in FIG. 1.

Figure 3:
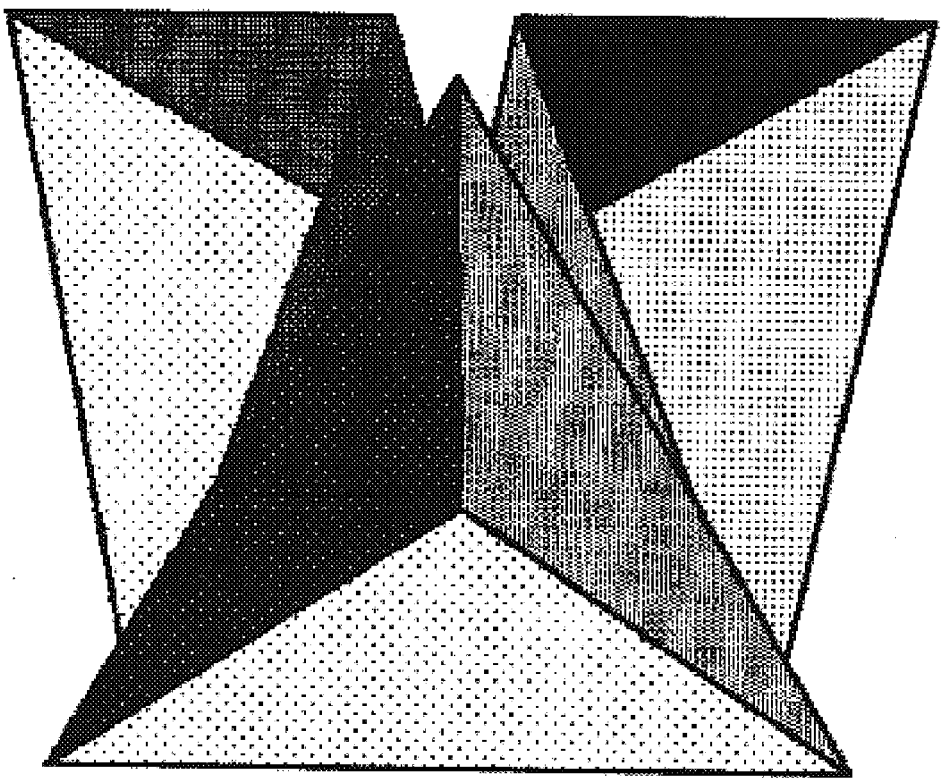
FIG. 3 illustrates three of the six corners shown in FIG. 2, from a different viewpoint.
Figure 4:
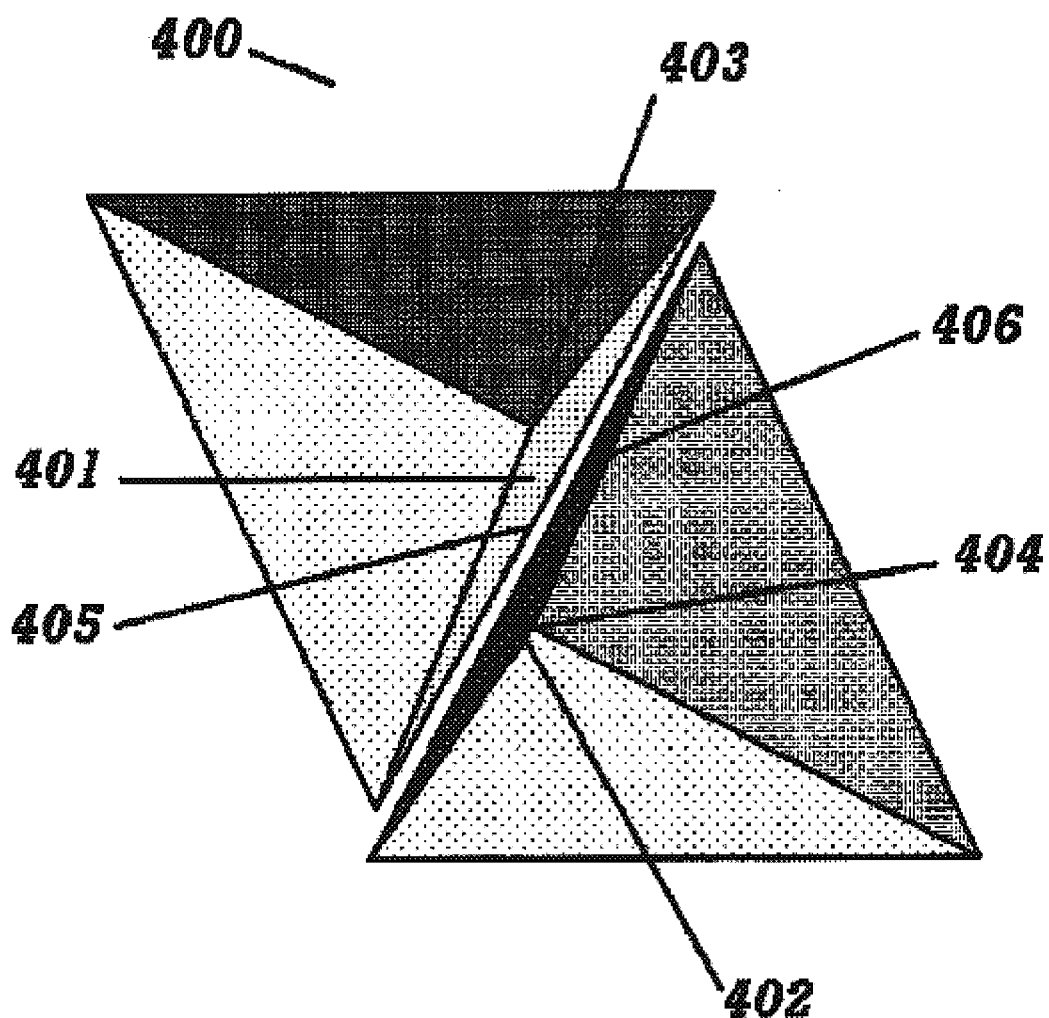
FIG. 4 illustrates two of the six corners shown in FIG. 2, from a different viewpoint.

FIG. 3 shows a different view of three of the corners from FIG. 2. FIG. 4 shows still another view, this time of two of the corners from FIG. 2. This figure illustrates that it is possible to see the interior of both surfaces 401 and 402 at the same time. This is a result of the opening rotation. In addition, it is possible to see both interior vertices, 403 and 404 from one viewing angle. These details would not change if the shape of the outer edges, 405 and 406, of these surfaces 401 and 402, were changed. As an alternative to this design, surfaces 401 and 402 might be extended out to their common intersection. As another alternative, the vertical distance between the interior vertices 403 and 404 might be decreased until surfaces 401 and 402 intersected. Then, these surfaces might be terminated along the curve of their intersection.

Figure 5:
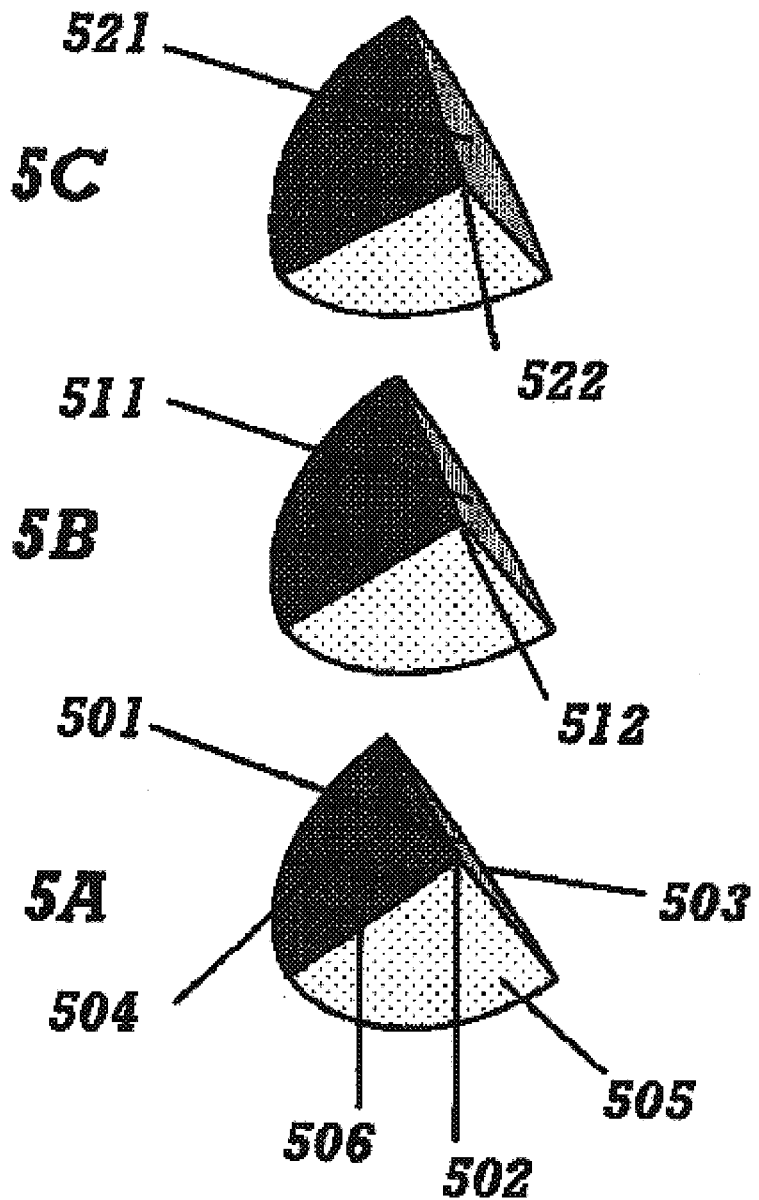
FIG. 5 illustrates one corner, viewed thirty degrees in azimuth from the direction which would look directly into that corner.

One example of an alternative shape for the outer edge of the corners is shown in FIG. 5. FIG. 5a shows a corner with surfaces 501, 504, and 505. Each of these surfaces is one quarter of a circular region. The surface 501 is terminated in a circular arc at 503. The surfaces 504 and 505 meet at the line 506. The length of this line is the radius of the circular region. All three views shown are for horizontal incidence, at an azimuth thirty degrees from looking straight into this corner. That is, if the azimuth were changed by thirty degrees from this view then surfaces 501 and 504 would present the same size to the viewer.

In FIG. 5a there is an opening rotation of 5 degrees, and as a result a small part of the interior of surface 501 may be seen and the interior vertex 502 may also be seen. Without any opening rotation, surface 501 would be in the plane of incidence. In FIG. 5b there is a ten degree opening rotation, and as a result more of the interior of surface 511 may be seen and the interior vertex 512 may also be seen clearly. In FIG. 5c there is a fifteen degree opening rotation, and as a result even more of the interior of surface 521 may be seen and the interior vertex 522 is also distinctly seen.

Consider two corners with vertices displaced vertically by a distance h. There may be some opening rotation, but that is not relevant at the moment. This array of (two) corners may be tilted by an angle t, as would occur on a healing boat. When looked at from the side (horizontally), the returns of these corners would necessarily interfere constructively, because the round trip path lengths agree to within one quarter of the wavelength, provided that $$2h\sin(t) < \lambda/4 \qquad (6)$$

The wavelength is denoted here by $\lambda$. From this formula it is clear that to ensure constructive interference over a large range of tilt (healing) angles t, it is important to keep h small. This is one reason why it is desirable to minimize the opening rotation.

It should be clear that while the array of corners has been describe with respect to the "vertical," this choice of words has been for convenience only. The array may be placed in any orientation. Most often, azimuthal directions are of most interest, meaning directions nearly perpendicular to vertical. If for some application the directions of interest are perpendicular to some other direction, then the array of corners could be rotated accordingly.

This invention provides a way to place the interior vertices of corners very close to each other, while generating a substantially uniform angular return. It also allows the interior of some corner to be visible at all azimuthal angles. Furthermore, it allows large corners to be used. Since for many incidence angles the strength of a signal from a corner is proportional to the fourth power of its linear dimension, it is preferable to use a small number of large corners rather than a large number of small corners.

There are further important design considerations. One example of such a consideration occurs when a corner is viewed from a direction nearly along one of its surfaces. In that case, it may effectively act as a retro reflector which uses two surfaces. Such a reflector has a round trip path length for the waves associated with a point somewhere along the junction between these two surfaces. This is called a dihedral. However, as one changes the incident direction slightly, so that a small amount of the projected area of the third surface becomes visible, a strong retro return quickly changes to a very weak return. Once the incident direction changes further, so that all three surfaces participate, the strength of the return increases. This is then called a trihedral.

For the standard array in hold water position, consider the strength of the retro return for one side corner. This is shown as the solid curve in FIG. 6, and is labeled 0 degrees of opening rotation in the caption. Over the middle of the open angles for this corner, there is a broad peak 601. This is called the trihedral return. It is centered about the direction which looks directly into this corner which is labeled as minus ninety degrees in the figure. The trihedral return for five degrees opening angle 604, for ten degrees opening angle 606 and for fifteen degrees opening angle 608 are also shown. For zero degrees opening rotation, at each side (labeled as –120 degrees and as –60 degrees in the figure) there is a more distinct peak 602. This is called the dihedral return. In between, there is a deep null 603. By a null we mean a weak return for some range of incidence angles. The difference in azimuthal angle between the two dihedral returns is approximately sixty degrees, as expected.

Figure 6:
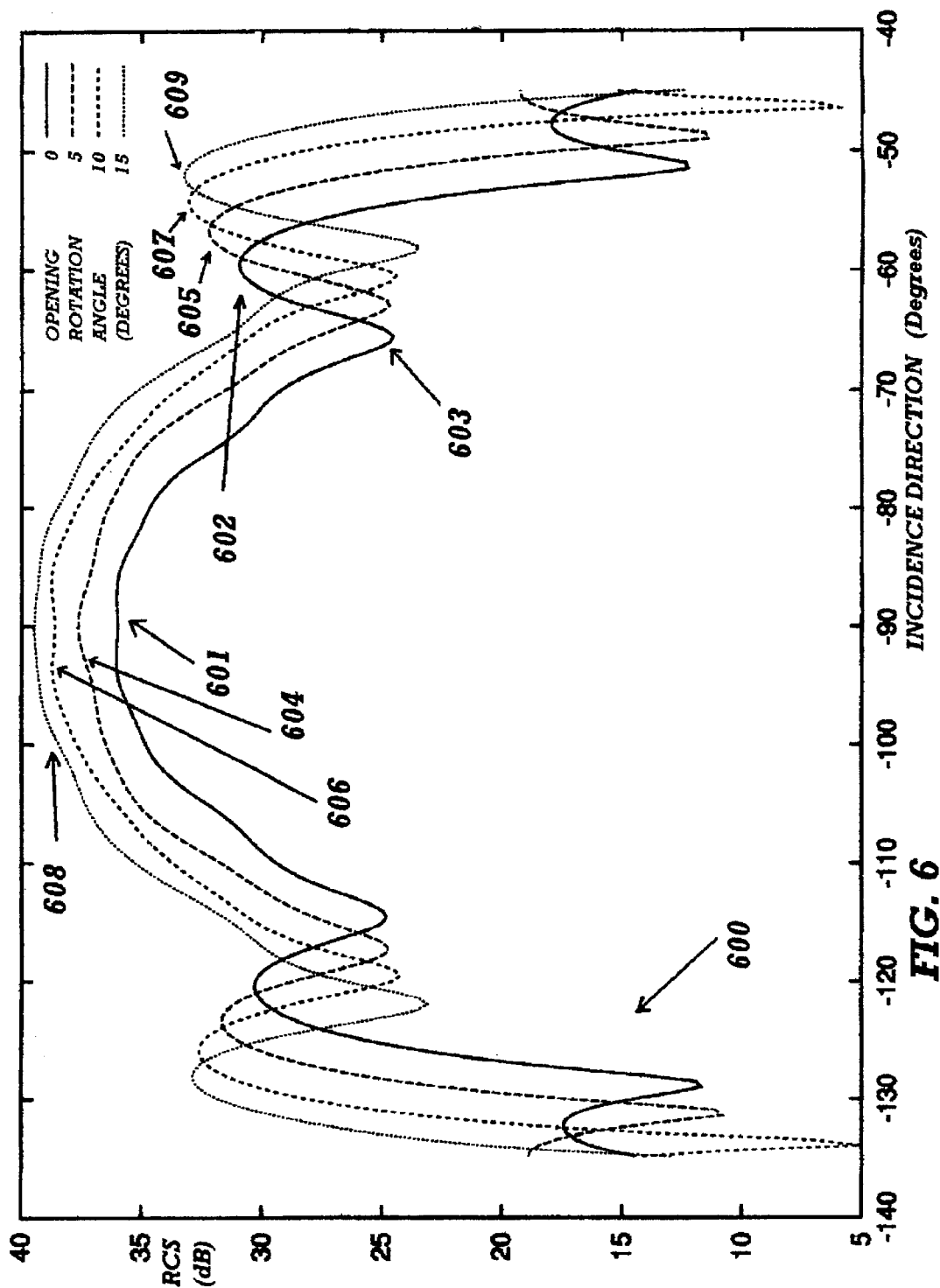
FIG. 6 shows the calculated Radar Cross Section (RCS) in decibels (dBs) for one corner, with sides of length five wavelengths and with surfaces terminated by exterior edges which are circular arcs. Results for opening rotations of zero, five, ten and fifteen degrees are shown. These computed results are the same regardless of whether an upper or lower corner is used. The RCS shown is for back scattering, meaning for scattering back towards the source, as it is on all these figures. The incidence direction of −90 degrees means looking directly into the corner.

Tilting the corners, meaning performing an opening rotation, stretches this pattern so that it occurs over more than sixty degrees. In FIG. 6 it can be seen that the larger the opening rotation the more the pattern is stretched. As the opening rotation changes first to five degrees, and on to ten degrees and fifteen degrees, the location of the dihedral peak moves first to 605 and on to 607 and 609 respectively. It can be seen that the magnitude of the dihedral peak also increases. Moving from zero to five degrees opening rotation, the peak 602 increases in magnitude to that at 605.

Moving from five degrees to ten degrees opening rotation, the peak at 605 increases in magnitude to that at 607. Both of these increases are roughly of the same magnitude. However, moving from ten to fifteen degrees of opening rotation, the magnitude of the dihedral peak increases only slightly from that at 607 to that at 609. The size of the broad trihedral peaks shown as 601, 604, 606, and 608 behave similarly. There is only a small increase from the peak for ten degrees of opening rotation 606 to that for fifteen degrees 608. It may be seen that there are advantages to performing a moderate opening rotation, meaning one smaller than a full opening rotation of 19.471 degrees. Often, there are further advantages to performing a limited opening rotation, one of fifteen degrees or less. Such a rotation still significantly increases the strength of the retro-return for one corner nearly as much as is possible, while there are significant disadvantages to large rotations. These disadvantages may be minimized by performing either a moderate opening rotation or a limited opening rotation.

It is possible to choose the opening rotation so that an "interlacing pattern" results. The term interlacing pattern will be used to mean that the null between the trihedral and dihedral returns from one corner is substantially filled in by the dihedral return from another corner. FIG. 6 may be used as an aid in understanding this. For example, consider the total return from two successive corners which are rotated by sixty degrees in azimuth from each other. It is possible to approximate the total return from these two corners. Pick an opening rotation, and find the associated curve on FIG. 6. Then, make a copy of this curve and translate it by sixty degrees. The sum of the effects of both curves will approximately describe what happens over the range of angles where both corners are significant.

Many of the design considerations given above are approximate. For example, the sum above did not take into account the relative phase of the returns from the two corners. A vector sum of the electric fields should actually be used, and then power should be computed from that sum. However, simply adding the values of the radar cross sections gives a rough idea of the correct answer. Thus, different opening rotations and different ways of fitting the rotated corners together may be used. The opening rotation angle is an especially important parameter. For a retro reflector which must function for instance on a sailboat which might heal over significantly, small opening rotation angles will be appropriate. These permit a small displacement of the interior vertices. For a retro reflector for say a large motor boat, which is not likely to heal over significantly, a much larger angle could be appropriate. On a stationary object still larger opening rotation angles might be an appropriate choice.

Preferred Embodiments

Figure 7:
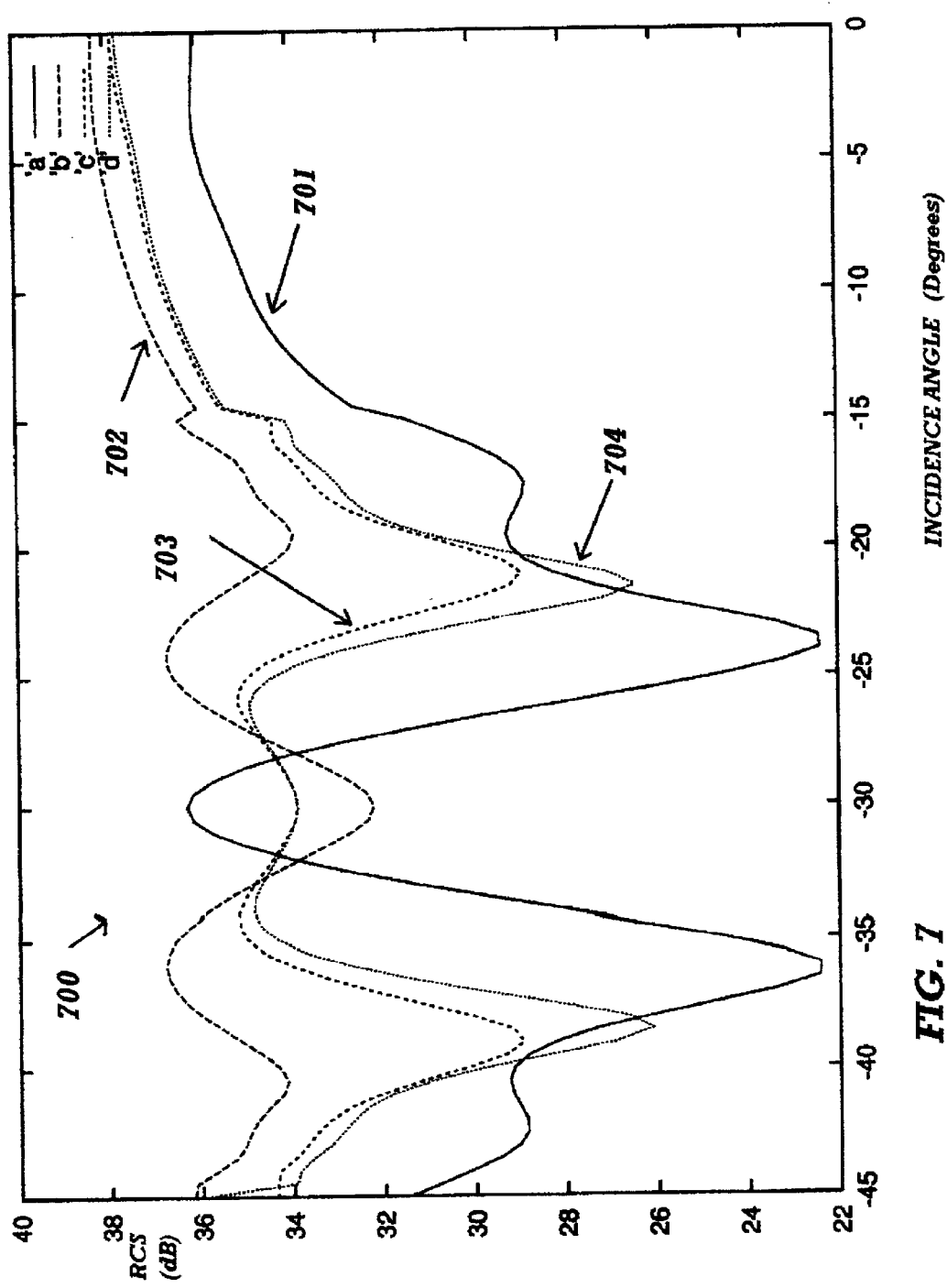
FIG. 7 shown the Radar Cross Section (RCS) in decibels (dB) for the backscattered (retro) direction. The results of four different calculations are shown; one for each of four different arrangements of corners. The incidence direction of 0 degrees means looking directly into one corner. The incidence direction of −30 degrees looks equally into two different corners. As an example of such a view, that shown in FIG. 4 also looks equally into two different corners.

FIG. 7 shows the radar cross section in the retro direction for four different arrangements of corners (FIGS. 6 through 9 all show the results of approximate numerical computations). The corners used for FIG. 7 all have sides formed from a ninety degree section of a circle. Two edges of each side are straight and are five wavelengths long. The third edge is a circular arc of radius five wavelengths. The curve 701 gives the radar cross section for the standard array of such corners in the hold water orientation.

The radar cross section for a first preferred embodiment is shown as the curve 702 in FIG. 7. An opening rotation of eight degrees is used. The three upper corners are displaced vertically by two and a tenth wavelengths above the three lower corners. In addition, the three lower corners are also each displaced radially by half a wavelength towards each other. The three upper corners are also each displaced radially by half a wavelength towards each other. As a result, they intersect. In actually constructing such an array of corners, the resulting intersecting region does not need to actually be constructed. Only the portion of the corners that do not pass through each other needs to be constructed.

It might be helpful to give an alternative description of this radial displacement. Before this displacement, the three interior vertices of either the upper or lower corners meet at a point. Each such corner has a symmetric ray, starting at the interior vertex and going through the interior of the corner. This symmetric ray may be projected onto a horizontal plane, to give a "horizontal symmetric ray." That entire corner is to be displaced by one half a wavelength in the direction opposite to this "horizontal symmetric ray." This is done to all three of the upper corners, and to all three of the lower corners.

The radar cross section for a second preferred embodiment is shown as the curve 703 in FIG. 7. An opening rotation of six degrees is used. The three upper corners are displaced vertically by eight tenths of a wavelength above the three lower corners. The three lower corners touch at a first point and the three upper corners touch a second point, which is eight tenths of a wavelength above the first point.

The radar cross section for a third preferred embodiment is shown as the curve 704 in FIG. 7. An opening rotation of six degrees is used. The three upper corners are displaced vertically by five tenths of a wavelength above the three lower corners. The three lower (upper) corners are each displaced radially outward by a quarter of a wavelength. This is a displacement of each corner in the direction of the horizontal symmetric ray for that corner. This embodiment has a small vertical displacement. That makes it especially appropriate for uses such as on a sailboat, which may heel significantly in a strong breeze, or on a buoy which might roll as waves pass by.

In FIG. 7 all of the four curves showing radar cross section, 701, 702, 703, and 704, are the result of an approximate numerical computation. They were computed using the two successive corners which were most important at that azimuthal angle. The answer found for these two corners would not be expected to differ significantly from a computation performed for all six corners. At these incidence angles the contribution of the other four corners would be expected to be small in comparison.

Figure 8:
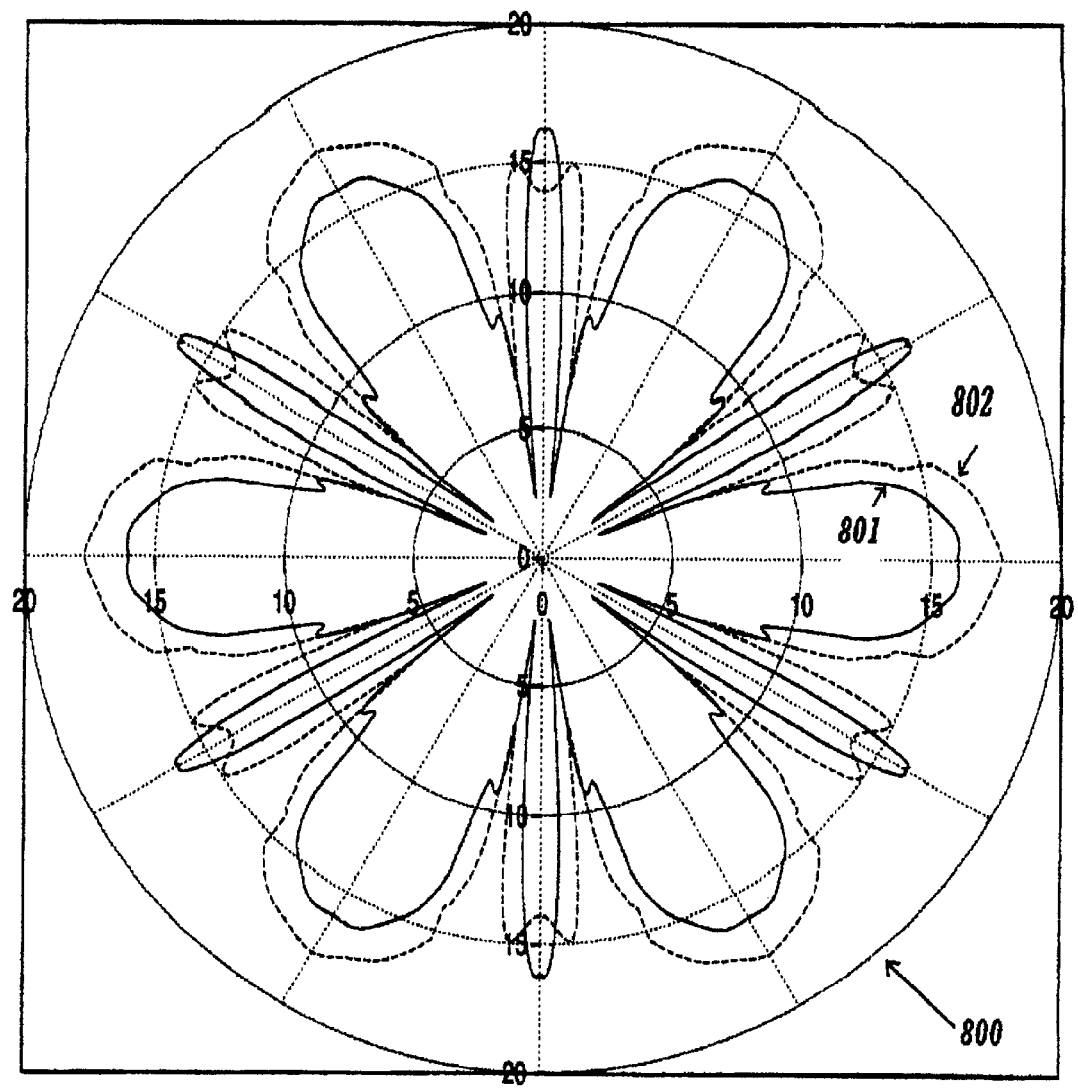
FIG. 8 shows a polar plot of a calculation of the back-scattered radar cross section as a function of angle for two different arrays of corner reflectors. The curve 801 shows the result for the standard array in hold water position, which corresponds to the curve 701 in FIG. 7. The curve 802 shows the result for the third preferred embodiment, which corresponds to the curve 704 in FIG. 7. The normalization used here which sets the value for zero decibels is different from that used in FIGS. 6 and 7.
Figure 9:
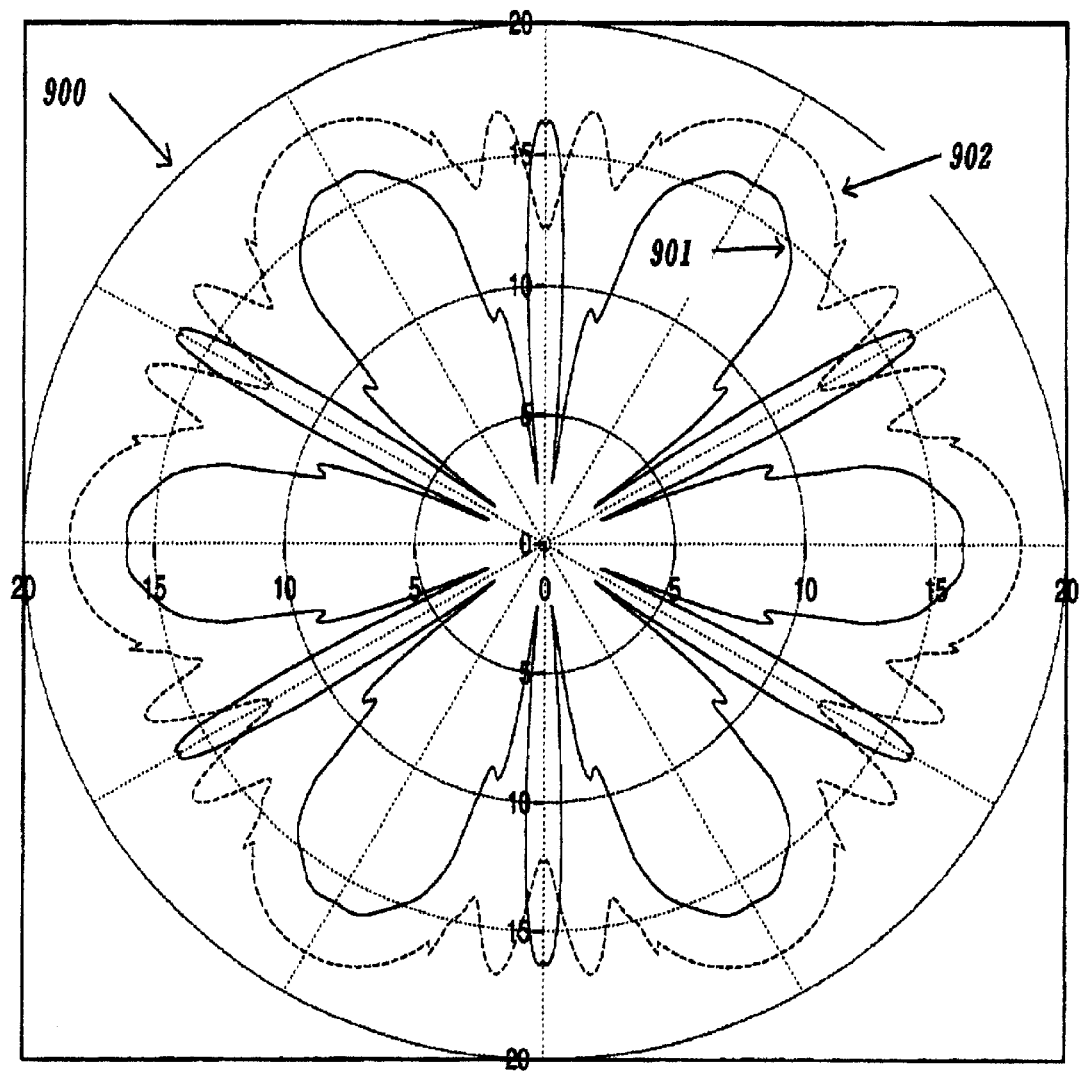
FIG. 9 shown a polar plot of a calculation of the backscattered radar cross section as a function of angle for two different arrays of corner reflectors. The curve 901 shows the result for the standard array in hold water position, which corresponds to the curve 701 in FIG. 7. The curve 902 shows the result for the first preferred embodiment, which corresponds to the curve 702 in FIG. 7. The normalization used here which sets the value for zero decibels is different from that used in FIGS. 6 and 7.

It is common to show the retro-returned radar cross section as a polar plot, showing all three hundred sixty degrees of azimuth. There is a six fold symmetry in this polar plot. Using that fact, it is possible to produce these polar plots from the data of FIG. 7. Polar plots are shown in FIGS. 8 and 9. The normalization used to define zero dB on these figures is different from that used on FIGS. 6 and 7. The patterns corresponding to 701 and 704 result in the patterns shown in FIG. 8 as 801 and 802. These patterns both give the radar cross section for the retro-return in units of decibels (dB). The patterns corresponding to 701 and 702 result in the patterns shown in FIG. 9 as 901 and 902.

It is clear that 902 shows a pattern which is much more uniform in azimuthal angle than 901. It is not only more uniform, it is also much larger for nearly all angles. The vertical displacement here of the interior vertices is two and a tenth wavelengths. This may be contrasted with a design using individual corners of the same size with a full opening rotation and no radial displacement. For that design a vertical displacement of approximately three and a half wavelengths or greater would have been necessary. There are several advantages of the first preferred embodiment as plotted in 902 over such a design. First, when looked at out of the horizontal plane, this preferred embodiment would tend to give larger and more uniform answers. This is because the corners would interfere constructively for a larger range of elevation angles, according to equation (6). Second, by moving the apexes inward radially a smaller volume is occupied by the array of this first preferred embodiment.

The third preferred embodiment has a vertical displacement of only one half a wavelength. According to equation (6) this allows good performance over an even larger range of elevation angles than the other two preferred embodiments. Such a small vertical displacement may be useful for applications where it is not possible to keep the reflector in close to a vertical orientation, such as on a small buoy.

All of the graphs of the strength of the scattered radiation show approximate numerical calculations for horizontally polarized radiation being transmitted, and for horizontal polarization radiation being received. Horizontal here refers to the orientation of the electric field vector. This is how the great majority of marine radars function. Nevertheless, the general principles about dihedral and trihedral returns described here apply regardless of polarization. This invention will also serve to provide a uniform return as a functions of angle also when other polarizations are used. Retro reflectors are also used when there is no polarization. For example, underwater sound and sound in air both primarily involve a longitudinal displacement. In more viscous fluids and in solids there may be a combination of longitudinal and transverse components. This invention may also be applied to such problems.

What is claimed is:

1. A retro-reflector comprising a first corner reflector and a second corner reflector, relatively disposed at substantially a sixty degree angle about a substantially vertical axis, wherein said first corner reflector has a moderate opening rotation.

2. The retro-reflector of claim 1 wherein said first corner reflector has a limited opening rotation.

3. The retro-reflector of claim 1 wherein said first and second corner reflectors have a moderate opening rotation.

4. The retro-reflector of claim 3 further comprising a total of six corner reflectors disposed to cover substantially all azimuthal angles of incidence.

5. The retro-reflector of claim 4 wherein said six corner reflectors have a moderate opening rotation.

6. The retro-reflector of claim 5 wherein for some pair of corner reflectors, the dihedral return from one of said pair of corner reflectors substantially fills in the region between the dihedral and trihedral returns of the other of said pair of cower reflectors.

7. The retro-reflector of claim 4 wherein said six corner reflectors have a limited opening rotation.

8. The retro-reflector of claim 7 wherein for some pair of corner reflectors, the dihedral return from one of said pair of corner reflectors substantially fills in the region between the dihedral and trihedral returns of the other of said pair of corner reflectors.

9. The retro-reflector of claim 8 wherein waves are being reflected and wherein said waves are chosen from the group consisting of electromagnetic waves, radar waves, and sound waves.

10. The retro-reflector of claim 9 wherein for one of the corner reflectors of claim 5 the interior vertex of one of said corner reflectors is displaced radially outward from a substantially vertical rotational axis of symmetry.

11. The retro-reflector of claim 4 wherein said six corner reflectors are disposed to give substantially a three fold rotational symmetry about a substantially vertical axis.

12. The retro-reflector of claim 4 wherein for some pair of corner reflectors, the dihedral return from one of said pair of corner reflectors substantially fills in the region between the dihedral and trihedral returns of the other of said pair of corner reflectors.

13. The retro-reflector of claim 1 wherein said first and second corner reflectors have a limited opening rotation and wherein for incident directions which are substantially perpendicular to said substantially vertical axis and for which the interior vertices of both of said corner reflectors are visible, the round trip path lengths agree to within one quarter of a wavelength.

14. A retro-reflector comprising six corner reflectors with a substantially a three fold rotational symmetry about a substantially vertical axis, wherein one of said corner reflectors has a limited opening rotation and wherein for some pair of corner reflectors, the dihedral return of one of said pair of cower reflectors substantially fills in the region between a dihedral and the trihedral returns of the other of said pair of corner reflectors.

15. The retro-reflector of claim 14 wherein there is an upper corner and there is a lower corner such that the interior vertex of said upper corner reflector is vertically higher than the interior vertex of said lower corner.

16. The retro-reflector of claim 14 wherein for one of the corner reflectors of claim 14 the interior vertex of said corner reflector is displaced radially inward from a substantially vertical rotational axis of symmetry.

17. A retro-reflector comprising a first corner reflector and a second corner reflector, wherein said first corner reflector has a dihedral return substantially fills in the region between a dihedral return and the trihedral return of said second corner reflector.

18. The retro-reflector of claim 17 wherein said first and second corner reflectors have a limited opening rotation.

19. The retro-reflector of claim 18 wherein the quantity being reflected is chosen from the group consisting of radar waves, laser radiation, light, electromagnetic waves, longitudinal sound waves, transverse sound waves, and sound waves having both a longitudinal and transverse component.

20. The retro-reflector of claim 18 wherein a wave phenomena is being reflected.

* * * * *